US009254906B1

United States Patent
Behroozi et al.

(10) Patent No.: US 9,254,906 B1
(45) Date of Patent: Feb. 9, 2016

(54) ATTITUDE CONTROL FOR A HIGH-ALTITUDE BALLOON

(71) Applicant: Google Inc., Mountain View, CA (US)

(72) Inventors: Cyrus Behroozi, Menlo Park, CA (US); Sergey Brin, Palo Alto, CA (US); Anton Valdemar Staaf, San Jose, CA (US)

(73) Assignee: Google Inc., Mountain View, CA (US)

( * ) Notice: Subject to any disclaimer, the term of this patent is extended or adjusted under 35 U.S.C. 154(b) by 264 days.

(21) Appl. No.: 14/071,396

(22) Filed: Nov. 4, 2013

(51) Int. Cl.
*B64B 1/58* (2006.01)

(52) U.S. Cl.
CPC ........................................ *B64B 1/58* (2013.01)

(58) Field of Classification Search
CPC .................................................... B64B 1/58
USPC ............................................................ 244/96
See application file for complete search history.

(56) References Cited

U.S. PATENT DOCUMENTS 5,158,250 A * 10/1992 Reboux .................. B64G 1/281
 136/244
5,413,293 A * 5/1995 Gomberg .................. B64G 1/32
 244/164
2012/0165010 A1* 6/2012 Lee ............................ F03D 5/00
 455/431
2013/0177321 A1* 7/2013 DeVaul .............. H04B 10/1129
 398/115

FOREIGN PATENT DOCUMENTS

WO 2011-061729 A1 5/2011

* cited by examiner

*Primary Examiner* — Justin Benedik
(74) *Attorney, Agent, or Firm* — McDonnell Boehnen Hulbert & Berghoff LLP

(57) ABSTRACT

A high-altitude balloon is provided that may use at least one conductive coil to facilitate attitude control of the balloon. The balloon may include an envelope, a conductive coil, and a control system. The conductive coil may be operatively coupled to the envelope, and the control system may be configured to perform functions. The functions may include determining a measure of rotation with respect to a predetermined orientation of the balloon. The functions may additionally include causing a current to be applied to the conductive coil in a manner such that torque is applied to the envelope that counteracts the measure of rotation and substantially returns the balloon to the predetermined orientation.

20 Claims, 6 Drawing Sheets

US 9,254,906 B1

ATTITUDE CONTROL FOR A HIGH-ALTITUDE BALLOON

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

Within examples, a high-altitude balloon is provided that may use at least one conductive coil to facilitate attitude control of the high-altitude balloon. In other words, example embodiments may help to provide attitude control and stabilization for a balloon in a data network that includes a plurality of balloons; for example, a mesh network formed by high-altitude balloons deployed in the stratosphere.

In a first aspect, a balloon is provided. The balloon may include an envelope. The balloon may also include a conductive coil operatively coupled to the envelope. The balloon may additionally include a control system configured to perform functions. The functions may include determining a measure of rotation of the balloon with respect to a predetermined orientation of the balloon. The functions may also include causing a current to be applied to the conductive coil in a manner such that torque is applied to the envelope that counteracts the measure of rotation and substantially returns the balloon to the predetermined orientation.

In a second aspect, a method is provided. The method may include determining a measure of rotation of a balloon comprising an envelope and a conductive coil operatively coupled to the envelope. The balloon may have a predetermined orientation. The method may also include causing a current to be applied to the conductive coil in a manner such that torque is applied to the envelope that counteracts the measure of rotation and substantially returns the balloon to the predetermined orientation.

In a third aspect, a system is provided. The system may include a balloon including an envelope. The system may also include a conductive coil, and the conductive coil may be operatively coupled to the envelope and the balloon may substantially extend along a perimeter of the balloon. The system may additionally include a control system configured to perform functions. The functions may include determining a measure of rotation of the balloon with respect to a predetermined orientation of the balloon. The functions may also include causing a current to be applied to the conductive coil in a manner such that torque is applied to the envelope that counteracts the measure of rotation and substantially returns the balloon to the predetermined orientation.

In a fourth aspect, a system may include a means for determining a measure of rotation of a balloon comprising an envelope and a conductive coil operatively coupled to the envelope. The balloon may have a predetermined orientation. The system may also include a means for causing a current to be applied to the conductive coil in a manner such that torque is applied to the envelope that counteracts the measure of rotation and substantially returns the balloon to the predetermined orientation.

These as well as other aspects, advantages, and alternatives, will become apparent to those of ordinary skill in the art by reading the following detailed description, with reference where appropriate to the accompanying drawings.

DETAILED DESCRIPTION

Figure 1:
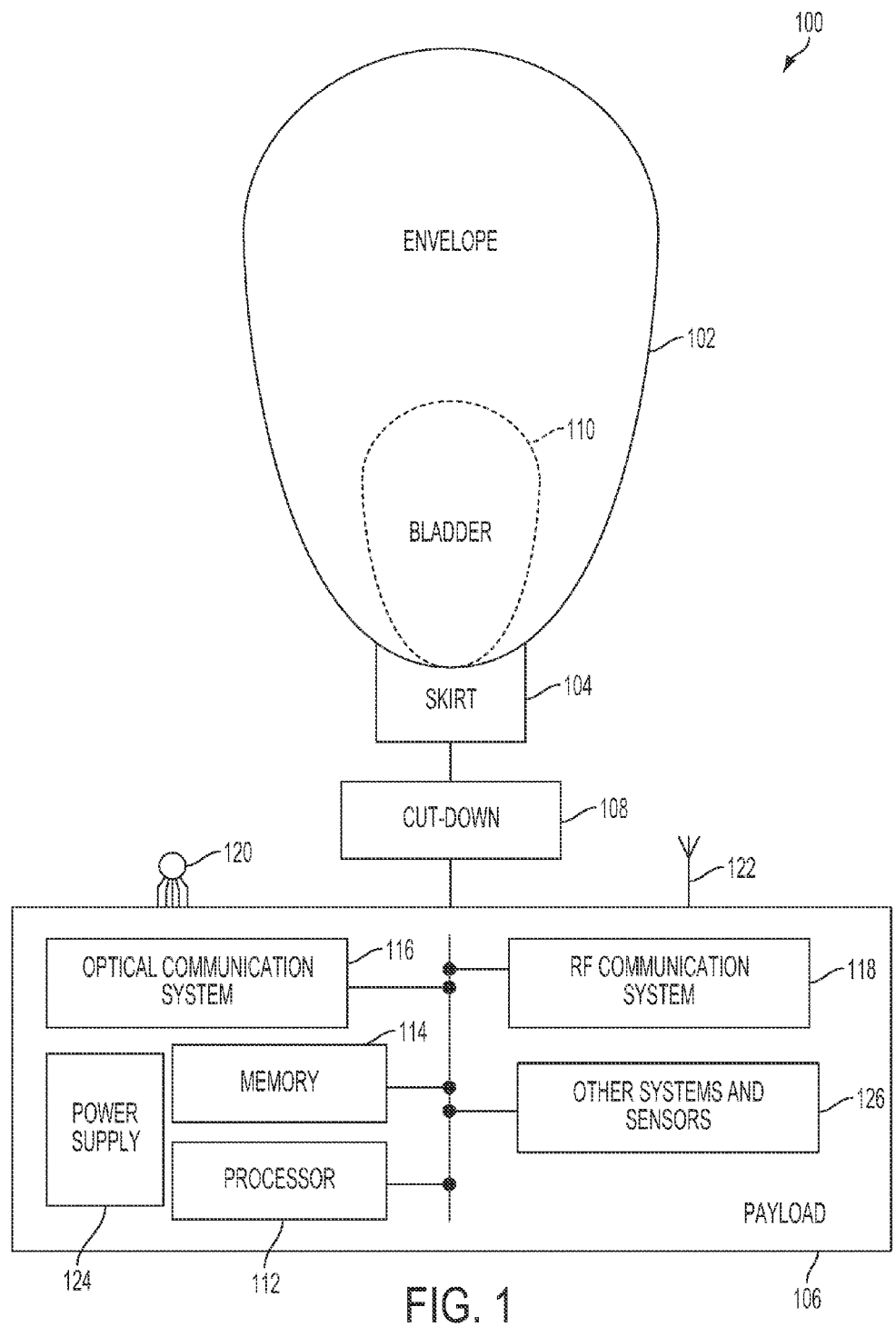
FIG. 1 is a simplified block diagram illustrating a high-altitude balloon, according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Additionally, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Example embodiments may help to provide attitude control and stabilization for a balloon in a data network that includes a plurality of balloons. Since stratospheric balloons tend to rotate naturally due to, for example, internal convection and atmospheric vorticity, the placement of components (e.g., solar panels) on a given balloon in an example network may be more difficult, the given balloon may require roaming and/or handoff among radio sectors to maintain connectivity to the network, and optical links may necessarily be more complicated to combat continued motion of the optical communication components. Note, however, that example embodiments may help to provide attitude control and stabilization for a balloon in many other contexts as well.

In some instances, various components can be added to the balloon and used to facilitate attitude control and stabilization. For example, a ring-laser gyroscope or other similar device may be used as a reaction wheel and may be added to the payload of the balloon. Upon determining a differential in a predetermined trajectory or orientation of the balloon, the payload may be actively rotated relative to the balloon to both re-orient the balloon and keep the balloon in the desired direction.

However, utilizing reaction wheels in this manner may require additional components to be added to the balloon and, in some instances, it may be difficult to integrate the additional components. For example, many reaction wheels require electric motors to rotate the reaction wheel and the addition of both the reaction wheel and the electronic motors may increase the weight of the balloon, which may be undesirable for various reasons. Moreover, the additional components (e.g., an electrical slip ring system) required to integrate the reaction wheels may impact reliability. Yet further, the use of a reaction wheel or propulsion system may induce undesired vibrations in the payload.

Example embodiments may help to control the attitude of a high-altitude balloon without lower weight and/or more compact components than mechanisms such as the reaction wheels described above. For instance, an example embodiment may help to provide stability and control by providing a configuration that encircles a balloon envelope of a given balloon with a conductive coil such that current passed through the conductive coil may generate torque that may be used to control the attitude of the given balloon (e.g., re-orient the balloon to reorient a solar panel that is located on the payload of the balloon). In some embodiments, multiple conductive coils may be used and a control system may be used to adjust the currents passing through each coil to keep the given balloon oriented in a desired direction. If, for example, a torque is being applied to the balloon (e.g., from internal convection), a counteracting torque may be required to keep the balloon from spinning, slow down the rotation of the balloon, or in some cases, reverse the rotation of the balloon. Such a counteracting torque may be provided the multiple conductive coils in an example system.

For instance, in an example balloon network, the balloons may communicate with one another using various communication types. Such communication types may include the use of lasers, bright LEDs, or radio-frequency (RE) communications. To effectively communicate with one another, the components of these communication techniques may rely on the stability and orientation of the communication devices. For example, a given balloon may obtain clear and efficient RF communication when an antenna is oriented in a certain manner. However, atmospheric vorticity may inhibit such orientation and it may be desirable to employ methods and systems that can re-orient and stabilize such devices.

To do so, the balloon may be configured to cause a current to be applied to a conductive coil operatively connected to an envelope of the balloon in a manner such that the conductive coil produces torque that may counteract the undesired vorticity and may re-orient the antenna. For instance, using a laser gyroscope, magnetic compass or other device it may be determined whether a given balloon is spinning (or rotating) in a certain direction and thereby, for example, changing the orientation of an antenna. Once determined, a current may be applied to a conductive coil of the balloon in a manner that produces a torque that compensates for the undesired movement of the balloon in attempt to re-orient the antenna.

Various types of balloon systems may be incorporated in an exemplary balloon network. An exemplary embodiment may utilize high-altitude balloons, which typically operate in an altitude range between 17 km and 22 km. FIG. 1 is a simplified block diagram illustrating a high-altitude balloon 100, according to an exemplary embodiment. As shown, the balloon 100 includes an envelope 102, a skirt 104, a payload 106, and a cut-down system 108 that is attached between the envelope 102 and payload 106.

The envelope 102 and skirt 104 may take various forms, which may be currently well-known or yet to be developed. For instance, the envelope 102 and/or skirt 104 may be made of a highly-flexible latex material or may be made of a rubber material such as chloroprene. Other materials are also possible. Further, the shape and size of the envelope 102 and skirt 104 may vary depending upon the particular implementation. Additionally, the envelope 102 may be filled with various different types of gases, such as helium and/or hydrogen. Other types of gases are possible as well.

The payload 106 of balloon 100 may include a processor 112 and on-board data storage, such as memory 114. The memory 114 may take the form of or include a non-transitory computer-readable medium. The non-transitory computer-readable medium may have instructions stored thereon, which can be accessed and executed by the processor 112 in order to carry out the balloon functions described herein.

The payload 106 of balloon 100 may also include various other types of equipment and systems to provide a number of different functions. For example, payload 106 may include optical communication system 116, which may transmit optical signals via an ultra-bright LED system 120, and which may receive optical signals via an optical-communication receiver (e.g., a photo-diode receiver system). Further, payload 106 may include an RF communication system 118, which may transmit and/or receive RF communications via an antenna system 122. The payload 106 may also include a power supply 124 to supply power to the various components of balloon 100.

Further, payload 106 may include various types of other systems and sensors 126. For example, payload 106 may include one or more video and/or still cameras, a GPS system, various motion sensors (e.g., accelerometers, gyroscopes, and/or compasses), and/or various sensors for capturing environmental data. Moreover, a rotational interface may be includes in payload 106, which may be used to measure rotation. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 106 includes an ultra-bright LED system 120 for free-space optical communication with other balloons. As such, optical communication system 116 may be configured to transmit a free-space optical signal by modulating the ultra-bright LED system 120. The optical communication system 116 may be implemented with mechanical systems and/or with hardware, firmware, and/or software. Generally, the manner in which an optical communication system is implemented may vary, depending upon the particular application, In a further aspect, balloon 100 may be configured for altitude control. For instance, balloon 100 may include a variable buoyancy system, which is configured to change the altitude of the balloon 300 by adjusting the volume and/or density of the gas in the balloon 100. A variable buoyancy system may take various forms, and may generally be any system that can change the volume and/or density of gas in envelope 102.

In an exemplary embodiment, a variable buoyancy system may include a bladder 110 that is located inside of envelope 102. The buoyancy of the balloon 100 may therefore be adjusted by changing the density and/or volume of the gas in bladder 110. To change the density in bladder 110, balloon 100 may be configured with systems and/or mechanisms for heating and/or cooling the gas in bladder 110. Further, to change the volume, balloon 100 may include pumps or other features for adding gas to and/or removing gas from bladder 110. Additionally or alternatively, to change the volume of bladder 110, balloon 100 may include release valves or other features that are controllable to allow air to escape from bladder 110.

Further, a balloon 106 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system make then make adjustments to the density of the balloon chamber in order to effectuate the determined attitudinal adjustments and cause the balloon to move laterally to the desired direction and/or to the desired location. Alternatively, the altitudinal adjustments may be computed by a ground-based control system and communicated to the high-altitude balloon.

As shown, the balloon 100 also includes a cut-down system 108. The cut-down system 108 may be activated to separate the payload 106 from the rest of balloon 100. This functionality may be utilized anytime the payload needs to be accessed on the ground, such as when it is time to remove balloon 100 from a balloon network, when maintenance is due on systems within payload 106, and/or when power supply 124 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground.

Figure 2A:
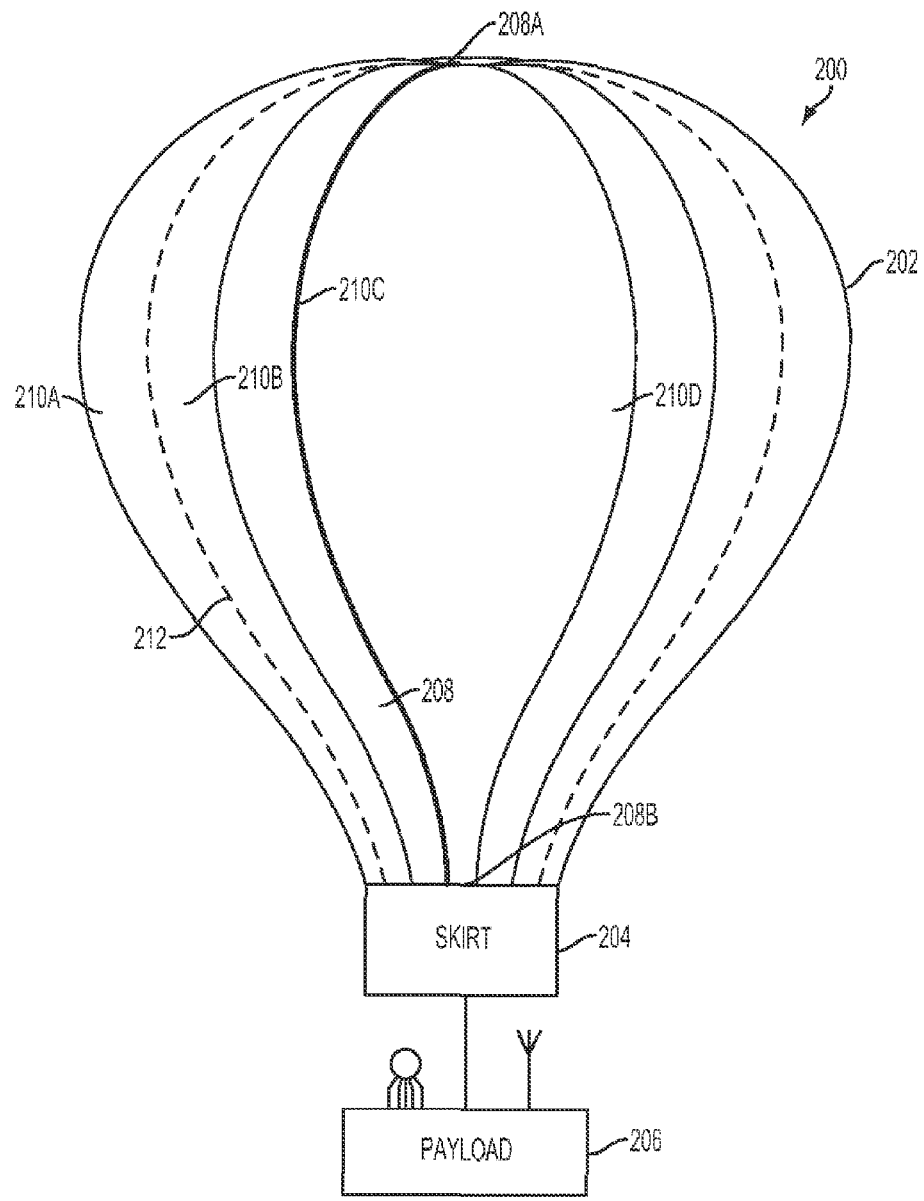
FIG. 2A is a simplified block diagram illustrating a high-altitude balloon with a conductive coil, according to an exemplary embodiment.

FIG. 2A is a simplified block diagram illustrating a high-altitude balloon 200 with a conductive coil, according to an exemplary embodiment. In FIG. 2A, balloon 200 may be the same as or similar to balloon 100 discussed above with reference to FIG. 1. Accordingly, balloon 200 may include an envelope 202, a skirt 204, and a payload 206. Balloon 200 may also include a conductive coil 208. Skirt 204 and payload 206 may be the same as or similar to skirt 104 and payload 106 discussed above with regard to balloon 100 of FIG. 1.

Balloon 200 may also include a control system (not shown). The control system may be configured to control operation(s) of balloon 200 and its components. In some embodiments, the control system may be configured to perform one or more functions described herein. Additionally, the control system may be implemented with mechanical systems and/or with hardware, firmware, and/or software. As one example, the control system may take the form of program instructions stored on a non-transitory computer readable medium and a processor that executes the instructions. The control system may be implemented in whole or in part on the balloon 200 (e.g., in payload 206) and/or at least one entity remotely located from the balloon 200. Generally, the manner in which the control system is implemented may vary, depending upon the particular application.

Conductive coil 208 is provided having two ends 208A, 208B which are supported by envelope 202 of balloon 200 (conductive coil 208 in FIG. 2A is represented by the bold line). Although not shown in FIG. 2A, conductive coil 208 extends substantially around the perimeter of envelope 202 of balloon 200 (the remainder of conductive coil 208 is positioned opposite the portion conductive coil 208 that is visible). In some examples, conductive coil 208 may not be positioned on the perimeter of envelope 202, but may instead be embedded in envelope 202. Additionally, conductive coil 208 may be one continuous coil or multiple pieces of coil operatively connected to each other. Generally, conductive coil 208 may be affixed to envelope 202 in any manner such that conductive coil 208 may generate a magnetic field that may interact with an external magnetic field for adjusting the attitude of balloon 200. In the embodiments described herein, conductive coil 208 may be made of copper or an aluminum film, but in other examples, the conductive coil may be made of other materials and may take other forms as well.

As shown, envelope 200 may include a plurality of gore sections 210A-210D that may each include two edges. Each gore section 210A-210D may be joined to an adjacent gore section along a shared edge (e.g., by seams) to form envelope 200. For example, gore section 210A may be joined to gore section 210B along a shared edge 212 (note, edge 212 is shown in dotted line to aid understanding). In some examples, each gore section 210A-210D may be heat sealed to each other at their adjacent edges in order to form a substantially gas tight enclosure. Additionally, each gore section may be made of light thermoplastic material (e.g., polyethylene) or any of the materials discussed above with reference to envelope 102 of FIG. 1. In some examples, the material used to make the gore sections may be laminated to create a relatively stronger material. Additionally, while not shown as such in FIG. 2A, in some examples, gore sections 210A-210D may be the same size and shape.

Figure 2B:
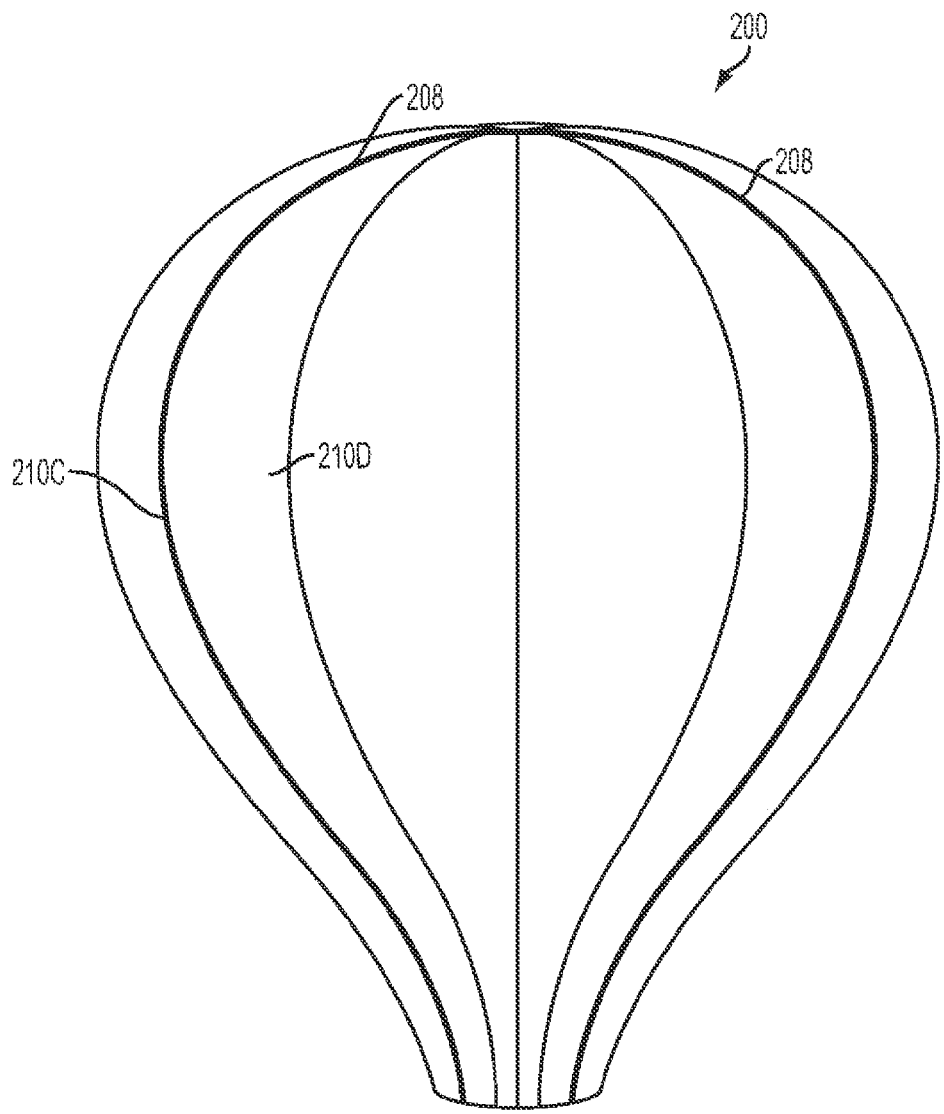
FIG. 2B is a simplified block diagram illustrating an enlarged gore section of a high-altitude balloon with a conductive coil, according to an exemplary embodiment.

To connect to envelope 200, conductive coil 208 may be operatively coupled to envelope 202. In other words, conductive coil 208 may be (a) arranged on envelope 202 in a manner such that it is coupled on an outer surface, on an inner surface, embedded in, or partially embedded in the envelope. For example, conductive coil 208 may be rigidly affixed to an edge of two gore sections 210A-210D such that it is adjacent and flush to the edge of the gore sections. As shown in FIG. 2A, conductive coil 208 is rigidly affixed to an edge belonging to gore section 210C and 210D. FIG. 2B illustrates enlarged gore sections 210A, 210D of high-altitude balloon 200 with a conductive coil 208. As shown in FIG. 2B, conductive coil 208 substantially extends around the perimeter of envelope 202.

Figure 2C:
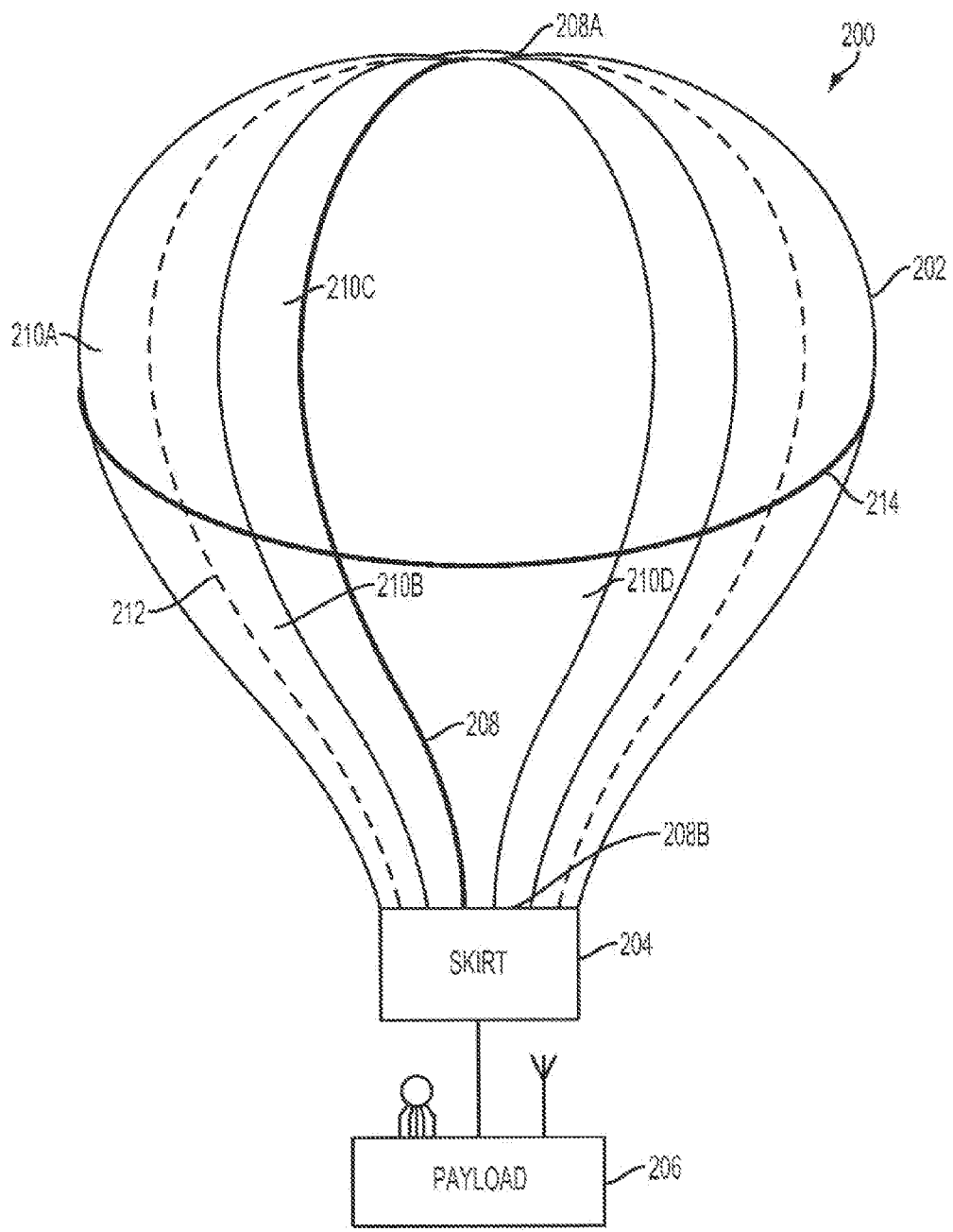
FIG. 2C is a simplified block diagram illustrating a high-altitude balloon with two conductive coils, according to an exemplary embodiment.

FIG. 2C is a simplified block diagram illustrating high-altitude balloon 200 with two conductive coils: conductive coil 208 and conductive coil 214. As shown in FIG. 2C, conductive coil 214 is positioned perpendicular to conductive coil 208. Additionally, conductive coil 214 is positioned in a manner such that conductive coil 214 is the second conductive coil is perpendicular to the various gore sections of the plurality of gore sections 210A-210D. However, in other examples, conductive coils 208 and 214 may be positioned in any manner that may allow conductive coil 208 and conductive coil 214 to continuously and effectively produce a current (and thereby produce a magnetic field) as balloon 200 orbits in the stratosphere above the Earth.

Figure 3:
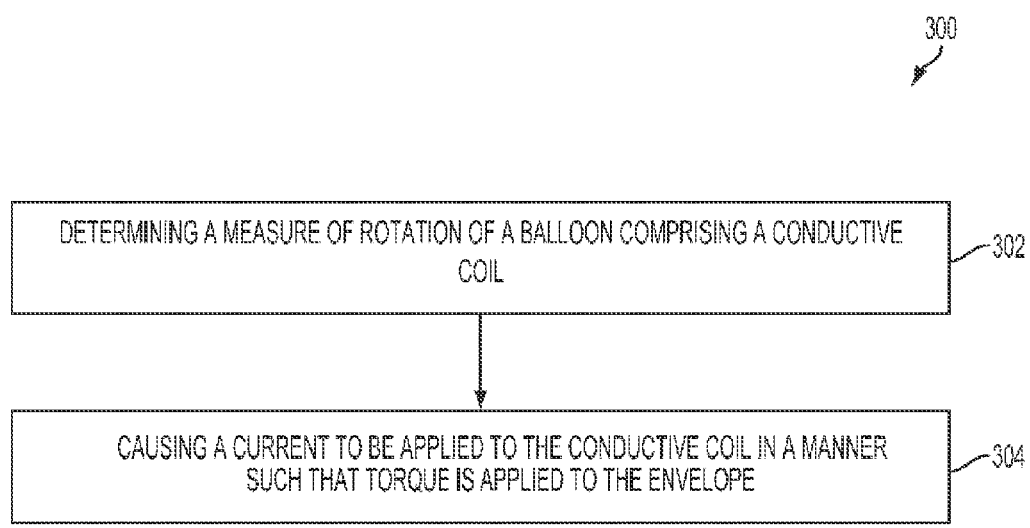
FIG. 3 is a block diagram of a method, according to an exemplary embodiment.

FIG. 3 illustrates a method that may be performed by a high-altitude balloon with at least one conductive coil such as high-altitude balloon 200 of FIGS. 2A and 2C. For example, the processes described herein may be performed by balloon 200 using a control system the same as or similar to the control system described above or a processor, such as processor 112 of payload 106, described with regard to FIG. 1.

Furthermore, it is noted that the functionality described in connection with the flowcharts described herein can be implemented as special-function and/or configured general-function hardware modules, portions of program code executed by a processor (e.g., processor 112) for achieving specific logical functions, determinations, and/or steps described in connection with the flowchart shown in FIG. 5. Where used, program code can be stored on any type of computer-readable medium (e.g., computer-readable storage medium or non-transitory media, such as the memory 114 described above with respect to balloon payload 106 and/or a computer program product 700 described below), for example, such as a storage device including a disk or hard drive.

In addition, although the blocks are illustrated in a sequential order, these blocks may also be performed in parallel, and/or in a different order than those described herein. Also, the various blocks may be combined into fewer blocks, divided into additional blocks, and/or removed based upon the desired implementation.

First at block 302, method 300 involves determining a measure of rotation of a balloon comprising a conductive coil. The conductive coil may be the same as or similar to conductive coil 208 or conductive coil 214 described above in reference to FIGS. 2A and 2B. The measurement may be made using the control system described above. Alternatively, in some examples, the measurement of rotation may be made using components of payload 200. For example, the measure of rotation and orientation of balloon 300 may be determined using processor 112 in combination with one or more of an accelerometer, gyroscope, and/or compass of other systems and sensors 126. In other examples, the rotation and orientation of balloon 300 may be determined by determining a movement associated with a communication device of the balloon. For example, an orientation and rotation may be determined for an antenna such as antenna 122. Knowing an original orientation associated with antenna 122, balloon 200 may determine a difference in orientation of antenna 122 and thereby determine whether antenna 122 needs to, for example, be re-oriented. In other examples, the determination may be based on any other movement may help define a measure of rotation and orientation of the communication device.

Figure 4:
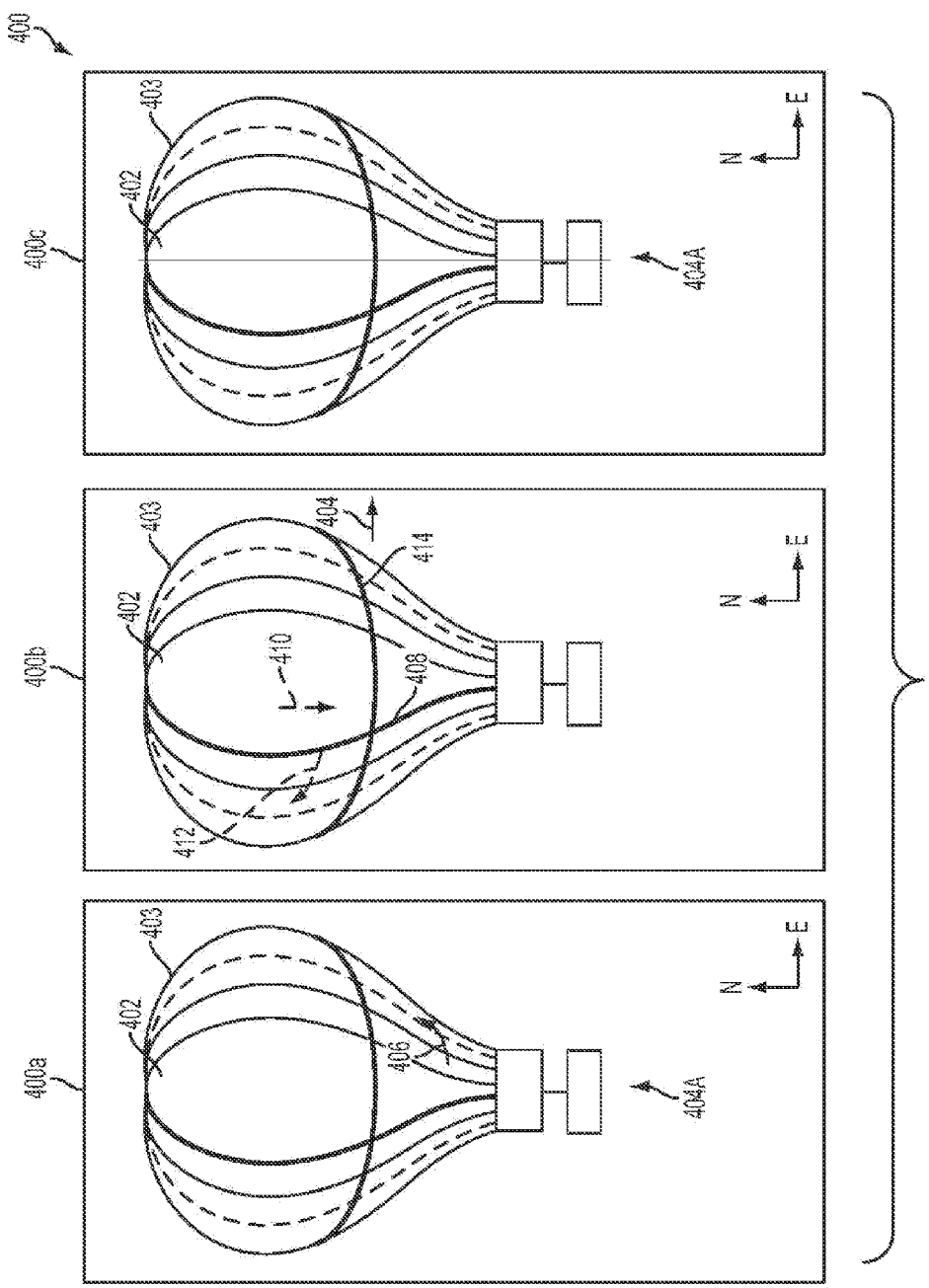
FIG. 4 is a high-altitude balloon operating scenario, according to an exemplary embodiment.

For example, balloon 402 of scenario 400 shown in FIG. 4, may be operating at a high-altitude along a certain trajectory or with a certain orientation. In this scenario, balloon 402 may begin with a straight north heading and its envelope 403 may have a minimal measure of rotation (not shown). As balloon 402 operates in the stratosphere above the Earth, balloon 402 may begin to naturally rotate due to internal convection and/or atmospheric vorticity. In other examples, balloon 402 may experience excessive winds or unexpected wind patterns that may cause balloon envelope 403 (and thereby balloon 402) to rotate. Periodically monitoring its orientation using, for example, processor 112 and various other systems and sensors 126, balloon 402 may determine, due to the internal convection and/or atmospheric vorticity, rotational and/or orientation differential from its original trajectory and orientation. For instance, referring to stage 400a of scenario 400, using a processor and a gyroscope, balloon 402 may determine that it now has a heading 404A of northeast, and using a rotation interface balloon 402 may determine that it has a rotational direction 406 of east.

Once the measure of rotation of the balloon has been determined, at block 304, method 300 of FIG. 3 involves causing a current to be applied to the conductive coil in a manner such that torque is applied to the envelope of the balloon. The torque may be applied to the balloon such that it substantially returns the balloon its predetermined orientation. To cause the current to be applied to the conductive coil, a control system, such as the one noted above, may include voltage modules that include current input terminals that may be used to supply current. Being operatively coupled to the control system via the voltage modules, a current may be applied to the conductive coil using the control system.

Referring again to scenario 400 of FIG. 4, if the new orientation and rotation of the balloon is undesirable (e.g., the balloon is determined to be rotating in a manner that may alter its desired orientation or inhibit the operation of various balloon communications) a current may be applied to conductive coil 408 to create a torque that may be applied to the balloon and counteract the undesired rotation and re-orient the balloon.

For example, the determination that balloon 402 has a heading 404 of northeast and a rotational direction 406 of east may not be desirable. As such, balloon 402 may attempt to counteract the rotational direction 406 and orientation 404 by applying current to conductive coil 408. This is shown in stage 400b in FIG. 4. Accordingly, in scenario 400 of FIG. 4, current 410 is being applied to conductive coil 408 in a manner such that a magnetic field is generated. As balloon 403 maneuvers above the Earth (not shown) in a manner such that the generated magnetic field interacts with a perpendicular magnetic field of a celestial body such as the Earth, a torque 412 is generated. Torque 412 may apply a torque force (fore applied west) that may be exerted on balloon 402 to help balloon 402 stop rotating east and may substantially re-orient balloon 402 to a straight north heading as is shown in stage 400c of FIG. 4. In some examples, substantially re-orienting balloon 402 may include re-orienting balloon 402 to be within a certain number of degrees or within a certain range.

Because high-altitude balloons, such as balloon 402 of FIG. 4, are continuously moving, at times balloon 402 may not necessarily be positioned in a manner such that conductive coil 408 may generate a magnetic field perpendicular to the Earth's magnetic field, but instead may only generate a magnetic field parallel to the Earth's magnetic field. In such cases, no torque force will be applied to balloon 402 because the current and the Earth's magnetic field are parallel. Accordingly, it may be beneficial to include a second conductive coil to balloon 402 such as conductive coil 414 as is depicted in FIG. 4. Thus, as balloon 402 operates, a control system or processor may control currents being applied to conductive coil 408 and conductive coil 414 such that a magnetic field perpendicular to the Earth's magnetic field is always generated. For example, in some cases a control system may provide current to conductive coil 408 and conductive coil 414 in an alternating manner.

Additionally, in some examples, coupling the conductive coil(s) to the balloon may also facilitate or aid the transfer of power from the one pole of the balloon to another. For example, if balloon 402 needs to deliver power from a payload of balloon 402 (not shown) to antenna or other communication devices that may reside at an upper portion of balloon 402 (not shown) that power transfer may be performed using the conductive coil. This may help minimize power consumption by reusing current that may be already flowing across the balloon to, for example, produce a torque force to counter act any undesired rotations.

Example methods, such as method 300 of FIG. 3 may be carried out in whole or in part by the balloon and its subsystems. Accordingly, example methods could be described by way of example herein as being implemented by the balloon. However, it should be understood that an example method may be implemented in whole or in part by other computing devices. For example, an example method may be implemented in whole or in part by a server system, which receives data from a device such as those associated with the balloon. Other examples of computing devices or combinations of computing devices that can implement an example method are possible.

In some embodiments, any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium. In addition, circuitry may be provided that is wired to perform logical functions in any processes or methods described herein.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A balloon comprising:
an envelope;
a conductive coil operatively coupled to the envelope; and
a control system configured to perform functions comprising:
determining a measure of rotation of the balloon with respect to a predetermined orientation of the balloon; and
causing a current to be applied to the conductive coil in a manner such that torque is applied to the envelope that counteracts the measure of rotation and substantially returns the balloon to the predetermined orientation.

2. The balloon of claim 1, wherein the conductive coil is operatively coupled to the envelope in a manner that the conductive coil substantially extends along a perimeter of the envelope.

3. The balloon of claim 1,
wherein the envelope comprises a plurality of gore sections,
wherein respective gore sections of the plurality of gore sections comprise two edges, and
wherein the conductive coil is coupled to an edge of the two edges of a respective gore section of the plurality of gore sections in a manner such that the conductive coil is rigidly connected and adjacent to the edge of the respective gore section.

4. The balloon of claim 1, wherein the conductive coil comprises a copper wire.

5. The balloon of claim 1, wherein the conductive coil comprises an aluminum film.

6. The balloon of claim 1, further comprising:
a second conductive coil, wherein the second conductive coil is perpendicular to the conductive coil and operatively coupled to the envelope.

7. The balloon of claim 6,
wherein the envelope comprises a plurality of gore sections,
wherein respective gore sections of the plurality of gore sections comprise two edges,
wherein the conductive coil is coupled to an edge of the two edges of a first respective gore section of the plurality of gore sections in a manner such that the conductive coil is rigidly connected and adjacent to the edge of the respective gore section, and
wherein the second conductive coil is coupled to a second respective gore section of the plurality of gore sections in a manner such that the second conductive coil is perpendicular to the second respective gore section of the plurality of gore sections.

8. The balloon of claim 6, wherein the control system is further configured to perform functions comprising:
causing a second current to be applied to the second conductive coil such that second torque is applied to the envelope in a manner that counteracts the measure of rotation and substantially returns the balloon to the predetermined orientation.

9. The balloon of claim 8, wherein the control system is further configured to perform functions comprising:
alternating the current applied to the conductive coil and the second current applied to the second conductive coil.

10. A method comprising:
determining a measure of rotation of a balloon comprising an envelope and a conductive coil operatively coupled to the envelope, wherein the balloon has a predetermined orientation; and
causing a current to be applied to the conductive coil in a manner such that torque is applied to the envelope that counteracts the measure of rotation and substantially returns the balloon to the predetermined orientation.

11. The method of claim 10,
wherein the balloon comprises a second conductive coil, and
wherein the second conductive coil is perpendicular to the conductive coil and operatively coupled to the envelope.

12. The method of claim 10, further comprising:
causing a second current to be applied to the second conductive coil such that second torque is applied to the envelope in a manner that counteracts the measure of rotation and substantially returns the balloon to the predetermined orientation.

13. The method of claim 10, further comprising alternating the current applied to the conductive coil with the second current applied to the second conductive coil.

14. A system comprising:
a balloon comprising an envelope;
a conductive coil, wherein the conductive coil is operatively coupled to the envelope and substantially extends along a perimeter of the envelope; and
a control system configured to perform functions comprising:
determining a measure of rotation of the balloon with respect to a predetermined orientation of the balloon; and
causing a current to be applied to the conductive coil in a manner such that torque is applied to the envelope that counteracts the measure of rotation and substantially returns the balloon to the predetermined orientation.

15. The system of claim 14,
wherein the envelope comprises a plurality of gore sections,
wherein respective gore sections of the plurality of gore sections comprise two edges, and
wherein the conductive coil is coupled to an edge of the two edges of a respective gore section of the plurality of gore sections in a manner such that the conductive coil is rigidly connected and adjacent to the edge of the respective gore section.

16. The system of claim 14, further comprising a second conductive coil, wherein the second conductive coil is perpendicular to the conductive coil and operatively coupled to the envelope.

17. The system of claim 16,
wherein the envelope comprises a plurality of gore sections,
wherein respective gore sections of the plurality of gore sections comprise two edges,
wherein the conductive coil is coupled to an edge of the two edges of a first respective gore section of the plurality of gore sections in a manner such that the conductive coil is rigidly connected and adjacent to the edge of the respective gore section, and
wherein the second conductive coil is coupled to a second respective gore section of the plurality of gore sections in a manner such that the second conductive coil is perpendicular to the second respective gore section of the plurality of gore sections.

18. The system of claim 16, wherein the control system is further configured to perform functions comprising:
causing a second current to be applied to the second conductive coil such that second torque is applied to the envelope in a manner that counteracts the measure of rotation and substantially returns the balloon to the predetermined orientation.

19. The system of claim 18, wherein the control system is further configured to perform functions comprising:
alternating the current applied to the conductive coil and the second current applied to the second conductive coil.

20. The system of claim 14, wherein the conductive coil comprises at least one of a copper wire or an aluminum film.

* * * * *